United States Patent [19]

Henderson

[11] 3,776,487

[45] Dec. 4, 1973

[54] VACUUM COLUMN FOR REEL SERVO

[75] Inventor: Joseph D. Henderson, Tulsa, Okla.

[73] Assignee: Telex Computer Products, Inc., Tulsa, Okla.

[22] Filed: Oct. 26, 1971

[21] Appl. No.: 192,076

[52] U.S. Cl. .............................................. 242/182

[51] Int. Cl. ....................... G11b 15/58, G11b 23/12

[58] Field of Search .................................................. 242/182–186; 226/95, 97

[56] References Cited

UNITED STATES PATENTS

| | | | |
|---|---|---|---|
| 3,106,357 | 10/1963 | Kobayashi et al. | 242/184 |
| 3,329,364 | 7/1967 | Brettell | 242/184 |

*Primary Examiner*—Leonard D. Christian
*Attorney*—Head & Johnson

[57] ABSTRACT

This invention describes an improved type of magnetic tape drive for computers in which a vacuum column is provided. A vacuum pulls the tape into the column, and the tape is pulled out by the capstan to the heads or, by the reel drive system. The system of this invention utilizes a plurality of small holes drilled through the back wall of the column down the length of the column, and a very narrow slot colinear with the drilled holes is provided in the front surface of the back wall. This narrow slot provides a certain amount of leakage of air from the high pressure above the tape into the vacuum below the tape. Thus as the tape moves downward, the small holes can sense the approach of the tape because of the leakage of air through the slit in advance of the tape loop. Thus by measuring air pressure in a chamber behind this set of holes, the position of the tape loop can be sensed on an almost linear basis, from one end to the other of the column. Servo means are provided to use this sensed position to continuously drive the reel motor.

4 Claims, 5 Drawing Figures

PATENTED DEC 4 1973

3,776,487

VACUUM COLUMN FOR REEL SERVO

BACKGROUND OF THE INVENTION

1. Field of the Invention

This invention is in the area of magnetic tape drives for computers. More particularly, it is concerned with the use of vacuum column drives for the tape. Still more particularly, it is concerned with a sensor system for controlling the servo that drives the reel of the tape, to feed tape into or out of the vacuum chamber.

2. Description of the Prior Art

Vacuum columns are almost universally used on high performance computer peripheral tape drives because of their ability to handle tape gently during the periods of high acceleration and high speed. As the reel drive system pulls tape out of a vacuum column or supplies tape to it, the reel motor must be controlled in such a way as to always maintain tape in the column. One method of accomplishing this is with a so-called bang-bang, or on-off servo. With this type of control the reel motor remains under a braked condition until the tape loop moves toward either end of the column. When the tape loop approaches a predetermined point near either end of the column, the reel motor is driven in the direction necessary to move the tape loop back toward the center of the column. As the tape loop approaches the column center, brakes are again applied to the drive motor. This type of drive system has several major disadvantages. One is that high peak torques are required of the motor, which requires high currents from the motor driver and power supply system. Also the erratic and sudden motion of the motor and reels causes vibration in the structure which cannot be completely isolated from the head area, and so can cause noise in the recorded information.

Another method of keeping tape in the column is with a linear position servo. In this type of system, tape position, or the position of the tape loop in the column, is continuously sensed and the reel motor is constantly driven in one direction or the other so as to keep the tape loop in the center of the column. Tape movement is very smooth and since the motor is operating more or less continuously, it runs at slow speed and the power dissipated is minimized. With this system it is necessary to have an electrical signal which is an analog of tape loop position in the column. This is difficult to obtain.

The prior art has utilized a plurality of small holes drilled in the back plate of the vacuum column spaced along the length of the plate. Then, as the tape loop moves along the column, the vacuum pressure in a plenum behind the plate changes from a high to a lower value, or vice-versa. Because of the discontinuous nature of the holes, the pressure curve is a stair-step type of curve, rather than a continuous ramp, and this makes for difficulty in the servo system.

SUMMARY OF THE INVENTION

These difficulties with the prior art devices and the objectives of this invention are met by the apparatus of this invention. The sensor system utilizes a plurality of drilled holes along the length of the column, with a very narrow and fairly deep slot machined into the surface of the back plate colinear with the line of holes. The cross section area of the slot is maintained at a small value to minimize the leakage of air from the high pressure side of the loop to the vacuum side. However, the width of the slot should be as narrow as is convenient to cut and maintain, so that there will be travel of air for a considerable distance down this slot in advance of the loop. Therefore the presence of the loop can be sensed well in advance of the movement of the loop past the individual holes.

It is a principle object of this invention to provide a reel drive vacuum sensor system so as to maintain the tape loop in the center of the vacuum column, with a minimum of power required and a minimum of noise and vibration generated.

These and other objects of this invention and a clear understanding of the principles of the invention will be evident from the following description taken in conjunction with the appended drawings, in which:

DESCRIPTION OF THE PREFERRED EMBODIMENT

Figure 1:
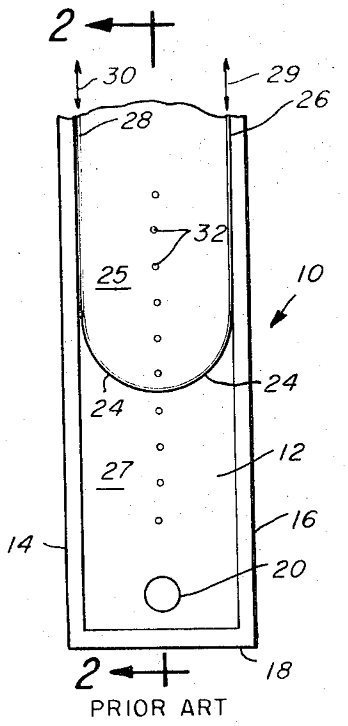
FIGS. 1 and 2 illustrate an elevation view from the front and an elevation view from the side, in section, of the prior art vacuum column tape system.
Figure 2:
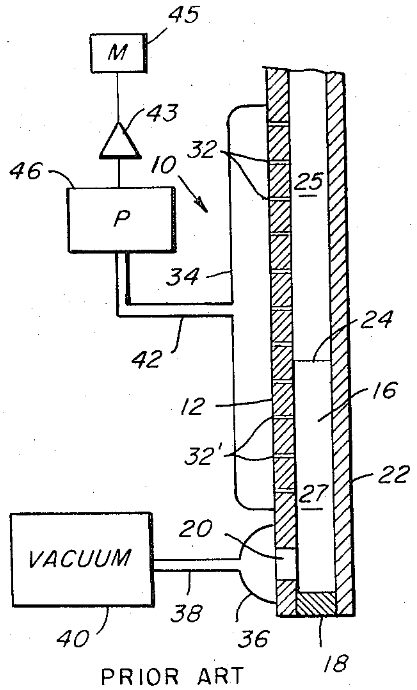

Referring to the drawings, and in particular to FIGS. 1 and 2 which show a front and a side view, in elevation, of the prior art is a vacuum column system for magnetic tape drives. This is generally indicated by the numeral 10. This comprises a vacuum column with back plate 12, side panels 14 and 16, and end panel 18. The tape loop itself closes off the top end. This is all covered with a glass plate 22 so as to maintain a vacuum in the lower portion of the chamber, the vacuum being created by an opening 20 connected to a collection chamber or plenum 36, a conduit 38 and a vacuum reservoir 40. The width of the side and end panels 14, 16, and 18 is approximately the width of the tape so that the tape, when positioned perpendicular to the surface of the back plate 12 will essentially close off and seal a portion of the column within the loop with atmospheric pressure, against a portion of the column below the tape loop, which is at vacuum pressure. The tape loop 24 has two upper ends 26 and 28 which can be moved in and out, 29 and 30, by means of the tape capstan, on one end, and the reel drive system on the other end. As the tape at one end, say, 26 is fed in or out from the heads by the capstan, the loop 24 must be maintained approximately in the center of the column so the reel drive system must correspondingly move the end 28 out or in, to compensate. A plurality of small diameter holes 32 are drilled through the back plate 12 along a vertical centerline of the vacuum column.

Figure 3:
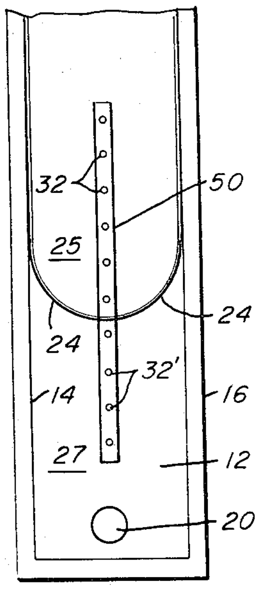
FIGS. 3 and 4 are similar views of the vacuum column tape system of this invention.
Figure 4:
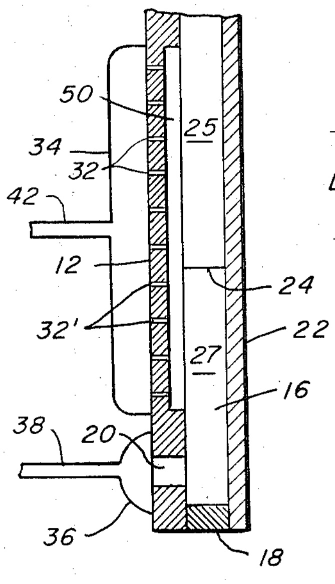

A collection chamber or plenum 34 is placed at the back of the plate 12. It collects air passing through the holes 32 from the space 25 within the tape loop less the air that leaks from the plenum through holes 32' below the loop 24 to the vacuum. The air pressure in the plenum 34 is measured by the sensor 46 through a conduit 42. As the tape loop 24 moves upward there will be fewer holes 32 feeding air at atmospheric pressure into the plenum and more holes 32' feeding air from the plenum to the vacuum. So the measured pressure will go down as the tape loop goes up and will increase as the tape loop moves down. Unfortunately the pressure sensed by 46 will vary in a stepwise fashion as one or more of the holes are moved out of or into the atmospheric pressure within the tape loop. The sensed pressure is amplified through a servo amplifier 43 to drive the reel motor 45, as is common practice. In this invention a modification of the vacuum column is provided in order to more nearly linearize, into a smooth ramp function, the pressure sensed by the sensor 46 as the tape loop moves up and down in the vacuum column. As shown in FIGS. 3 and 4, a narrow slot 50 is milled into the front face of the back panel 12, colinear with the line of holes 32.

The operation of this improvement will be illustrated in connection with FIG. 5 which shows, in section, three views of the back plate 12. In view A, there is a very narrow and deep slot 50 cut into the panel. In view B the channel 50 that is cut is a wide, shallow channel. In view C there is no channel cut. View C corresponds to prior art condition. In the views D, E, and F are shown in section the back plate 12 with the holes 32, the top glass plate 22, and the tape loop 24. Superimposed on this diagram is a pressure curve illustrated as 54, 55, and 56. Curve 54 represents the atmospheric pressure condition within the tape loop that is to the left of the tape loop 24. Curve 56 represents the vacuum pressure in the column that is to the right of the tape loop 24. With the slot cut into the back plate air will flow under the tape loop 24, through the slot from the high pressure 54 down to the low pressure 56. If it is measured incrementally to the right from the tape loop 24 the pressure will show a curve such as 55 starting at the pressure 54 behind the loop in the area 25, and ending at the pressure 56 of the vacuum portion 27 of the column. The cross section area of the groove is limited to a reasonably small value so that the escape of air from area 25 in the tape loop to space 27 in the vacuum portion will be of nominal value. However, the shape of this groove is important since it is important to have the air leakage carry as far down the column as possible while it is expanding upward through the top of the slot into the vacuum space. When the slot is very narrow and deep, as in view D, the air pressure in the slot, will carry a considerable distance down the column. This is shown by the curve 55 which represents the pressure in front of the tape loop. In view E, which corresponds to the wide shallow groove of view B, the pressure dissipates upward into the vacuum space very quickly. Thus, the pressure measured in the groove, at the holes, is in accordance with the curve 57. That is, it drops off very rapidly with distance beyond the loop 24. In view F the system shows a pressure 54 inside the loop which drops rapidly 58 down to the vacuum pressure 56 in front of the loop.

Figure 5:
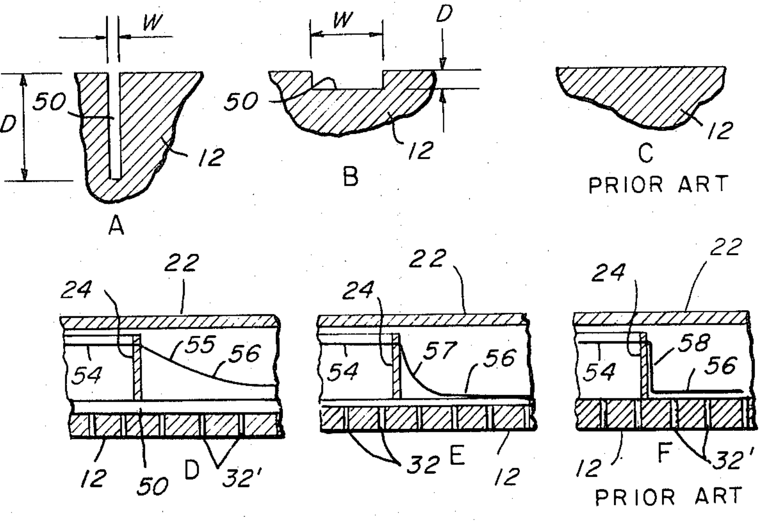
FIG. 5 is a view which illustrates the manner in which the improvement of this invention facilitates the sensing of the position of the tape loop in the vacuum column.

It is clear that the configuration of view D of FIG. 5 is the most satisfactory one for sensing the position of the tape loop 24 as it moves down, or up, the column. Comparing this with view F we see that in view F, as the tape moves from one side to the other of an individual hole 32 the pressure sensed by that hole will suddenly change by the magnitude of 56 to 54, or reverse, which creates the stair-step type of pressure sensing. With the ability to detect the position of the loop by the air pressure in the region ahead of the loop, the stair-step curve of pressure is smoothed out into a more or less continuous ramp function, which provides the ideal type of signal to control the servo driving the reel motor.

Since the conventional system of vacuum pumps, sensor, reel drive systems, etc. are well known in the art there is not felt to be any need for description of these features. The invention is limited to the presence and the design of the slot 50 that is cut into the back panel in conjunction with the drilled holes, in order to facilitate the sensing of the position of the tape loop 24.

The views of FIG. 5 indicate the importance of a narrow deep slot. It has been found useful to provide a slot 0.020 inch wide and 0.100 inch deep. However, slots that are still narrower and deeper would be found useful. In general, the holes bored through the back panel are approximately 0.020 inch diameter, and are spaced apart about one-half inch along the length of the column. The tape column itself is about 2 ½ inches wide and about ½ inch deep, corresponding to the width of the tape itself.

While the invention has been described with a certain degree of particularity, it is manifest that many changes may be made in the details of construction and the arrangement of components. It is understood that the invention is not to be limited to the specific embodiment set forth herein by way of exemplifying the invention but the invention is to be limited only by the scope of the attached claim or claims including the full range of equivalency to which each element or step thereof is entitled.

What is claimed:

1. In a tape handling system including at least one vacuum tape column for controlling a loop of tape, in which a plurality of small diameter holes are provided along the centerline of and through the back plate of the column, with a plenum chamber at the back of said plate, pressure sensor means to measure the pressure in said plenum, and servo means responsive to said sensor means to control the reel drive system, the improvement comprising:

a narrow longitudinal channel of uniform cross section cut into the front face of said back plate colinear with the line of said plurality of holes, whereby air will leak through said channel from the high pressure above the loop into the low pressure below the loop and said sensor will have a more linear indication of the position of said loop.

2. The tape handling system as in claim 1 in which said channel is at least five times as deep as it is wide.

3. The tape handling system as in claim 1 in which said channel is less than 0.020 inch wide and more than 0.100 inch deep.

4. The tape handling system as in claim 1 in which said channel is in the range of 0.010 inch to 0.025 inch wide and 0.075 inch to 0.200 inch deep.

* * * * *